(12) United States Patent
Clauvelin et al.

(10) Patent No.: US 11,965,555 B2
(45) Date of Patent: Apr. 23, 2024

(54) ROLLING BEARING WITH IMPROVED LIFETIME

(71) Applicants: SKF Aerospace France S.A.S, Montigny-le-Bretonneux (FR); Aktiebolaget SKF, Gothenburg (SE)

(72) Inventors: Jean-Philippe Clauvelin, Valence (FR); Esteban Daniel Broitman, Houten (NL); Thilo von Schleinitz, Schweinfurt (DE)

(73) Assignee: SKF Aerospace France S.A.S, Montigny-le-bretonneux (FR)

( * ) Notice: Subject to any disclaimer, the term of this patent is extended or adjusted under 35 U.S.C. 154(b) by 2 days.

(21) Appl. No.: 17/713,332

(22) Filed: Apr. 5, 2022

(65) Prior Publication Data
US 2022/0341466 A1    Oct. 27, 2022

(30) Foreign Application Priority Data
Apr. 22, 2021   (FR) ......................... 2104196

(51) Int. Cl.
| | | |
|---|---|---|
| *F16C 33/62* | (2006.01) | |
| *F16C 19/38* | (2006.01) | |
| *F16C 33/36* | (2006.01) | |

(52) U.S. Cl.
CPC ............ *F16C 33/62* (2013.01); *F16C 19/386* (2013.01); *F16C 33/366* (2013.01); *F05C 2203/083* (2013.01); *F05C 2253/12* (2013.01); *F16C 2206/04* (2013.01); *F16C 2223/30* (2013.01)

(58) Field of Classification Search
CPC ...... F16C 33/366; F16C 33/585; F16C 33/62; F16C 2206/04; F16C 2206/58; F16C 2223/30
See application file for complete search history.

(56) References Cited

U.S. PATENT DOCUMENTS

| | | | |
|---|---|---|---|
| 5,700,094 A | 12/1997 | Dam et al. | |
| 6,290,398 B1 * | 9/2001 | Fujiwara | F16C 33/64 384/492 |
| 8,672,556 B2 * | 3/2014 | Himeno | C08G 69/36 384/909 |
| 8,801,292 B2 * | 8/2014 | Kobayashi | F16C 19/225 384/463 |

(Continued)

FOREIGN PATENT DOCUMENTS

| | | |
|---|---|---|
| EP | 2690297 A1 | 1/2014 |
| FR | 2786543 A1 | 6/2000 |

(Continued)

OTHER PUBLICATIONS

Translation of JP2009-103282, May 14, 2009.*
Translation of JP2003-156083, May 14, 2009.*

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A rolling bearing having an outer ring, an inner ring, and at least one row of rolling elements disposed between two raceways of the outer and inner rings. Furthermore, the raceway of the outer ring and/or the raceway of the inner ring at least partially provide a coating based on chromium nitride, the rolling elements at least partially include a coating based on carbon.

18 Claims, 4 Drawing Sheets

(56) References Cited

U.S. PATENT DOCUMENTS 9,003,663 B2 * 4/2015 Kelsey .................... F16C 33/34
                                                                                                       29/898.04
9,562,600 B2 * 2/2017 Champalou ............. F16C 13/02

FOREIGN PATENT DOCUMENTS

| | | | |
|---|---|---|---|
| FR | 2798708 | A1 | 3/2001 |
| JP | 2003-156053 | * | 5/2003 |
| JP | 2009-103282 | * | 5/2009 |
| WO | WO1999014512 | A1 | 3/1999 |

* cited by examiner

ROLLING BEARING WITH IMPROVED LIFETIME

CROSS-REFERENCE TO RELATED APPLICATIONS

This application claims priority to French Patent Application no. 2104196, filed Apr. 22, 2021, the contents of which is fully incorporated herein by reference.

TECHNICAL FIELD

The present invention relates, generally, to rolling bearings and in particular the contact wear to which rolling bearings are subject, in particular stationary rolling bearings. More specifically, the invention relates to a rolling bearing with improved resistance to contact wear.

BACKGROUND OF THE INVENTION

Typically, a rolling bearing comprises an outer ring, an inner ring, at least one row of rolling elements disposed between raceways of the outer and inner rings, and a cage intended to hold the rolling elements at regular intervals.

Depending on their location and on their function, some rolling bearings are required to remain stationary. They operate occasionally, and have to rotate only in cases of emergency. The term then used is stationary rolling bearing.

For example, the rear rotor of a helicopter comprises a main rolling bearing and an emergency system composed of a fixed secondary rolling bearing which operates in case of blockage of the main rolling bearing. It is therefore critical for it to operate at the right moment.

Nevertheless, stationary rolling bearings are particularly subject to surface damage, notably to contact wear called false Brinell effect or false brinelling.

The false brinelling phenomenon describes the appearance of irreversible hollow marks on the raceways due to an abnormally high strain exerted by the rolling elements and caused by movements of very small amplitudes such as vibrations and oscillations.

This leads to the degradation of the surface of the raceways of the inner and outer rings of the rolling bearing, resulting in premature wear of all of the rolling bearing.

Given the function of fixed rolling bearings, it is important to prevent the appearance of such damage, which affects their operation.

In order to avoid the phenomenon of false brinelling, it is known practice to submit the raceways to heat treatment, nitriding, for the purpose of effecting a treatment of the surface of the steel to increase its surface hardness.

One alternative solution consists in replacing the rolling elements made of steel with rolling elements made of ceramic.

However, the process of nitriding the outer and inner rings and incorporating rolling elements made of ceramic are complex and expensive solutions.

SUMMARY OF THE INVENTION

Therefore, the aim of the invention is to remedy these drawbacks and to propose a rolling bearing with improved lifetime, that is more resistant to the appearance of damage caused by false brinelling, that is simple to manufacture and that is inexpensive.

A rolling bearing is therefore proposed comprising an outer ring, an inner ring, and at least one row of rolling elements disposed between raceways of the outer and inner rings.

Furthermore, the raceways of the outer ring and/or of the inner ring at least partially comprise a coating based on chromium nitride and the rolling elements at least partially comprise a coating based on carbon.

The association of the coating based on carbon and of the coating based on chromium nitride makes it possible to considerably improve the resistance to contact wear, in particular false brinelling, compared to a rolling bearing that is not coated and compared to a rolling bearing comprising only a coating based on carbon or only a coating based on chromium nitride.

Advantageously, the rolling bearing comprises at least two seals disposed between the outer and inner rings and delimiting between the rings a leaktight space inside which is housed the row of rolling elements, the leaktight space being filled with grease comprising molybdenum disulfide.

Preferably, only all of the raceway of the outer ring is coated by the coating based on chromium nitride.

Preferably, the rolling elements can be rollers comprising a first end face, a second end face opposite the first end face, and an outer rolling surface extending between the first and second end faces, the coating based on carbon being disposed only on one of the end faces and on the outer rolling surface of each roller.

Advantageously, the rolling elements can be rollers comprising a first end face, a second end face opposite the first end face and an outer rolling surface extending between the first and second end faces, and the coating based on chromium nitride is disposed only on all of the raceway and on all the surface of the inner ring disposed facing the end faces of the rollers.

Advantageously, the surface of the inner ring disposed facing the end faces of the rollers and coated with a coating based on chromium nitride can comprise a retaining shoulder, a first machining undercut, a second machining undercut and a guiding shoulder.

Preferably, the thickness of the coating based on carbon lies between 1 and 3 µm.

Preferably, the thickness of the coating based on chromium nitride lies between 3 and 5 µm.

In one embodiment, the raceways are formed directly on the outer and inner rings. As a variant, the raceways could be formed by tracks added and fixed onto the outer and inner rings.

In one embodiment, the coating based on carbon is a diamond-type carbon coating mixed with a metal.

The invention relates also to a rear helicopter rotor comprising a rolling bearing as described previously.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other aims, advantages and features will emerge from the following description, given in a purely illustrative manner and with reference to the attached drawings, in which.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three-percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following, and failing any other indication, the limits of a range of values are included in this range, notably in the expression "is between" or "lies between".

Figure 1:
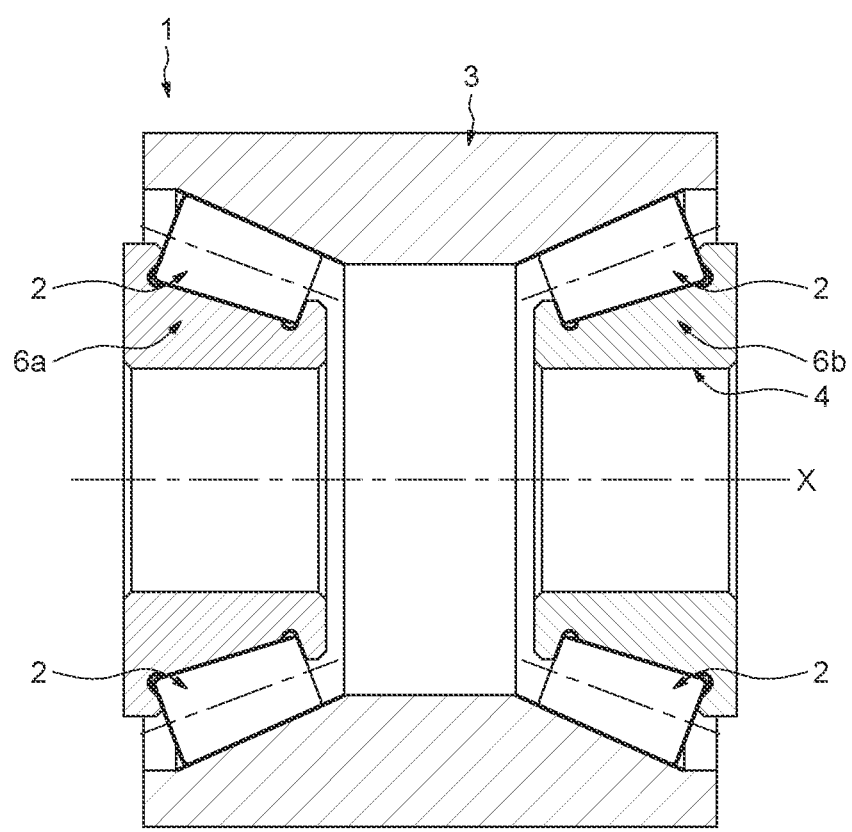
FIG. 1 illustrates a rolling bearing according to an example of the invention.

FIG. 1 illustrates a rolling bearing which can be used alone or as secondary bearing of a combined rolling bearing comprising a main rolling bearing not represented and this secondary rolling bearing.

According to the embodiment illustrated, the rolling bearing 1 comprises two rows of rolling elements which, in this example, are tapered rollers 2.

The rolling bearing 1 illustrated is a backup bearing of a rear helicopter rotor rolling bearing, the operation of which is advantageously triggered in the event of blockage of the main rolling bearing.

The rolling bearing 1 comprises an outer ring 3 and an inner ring 4. The row of rolling elements 2 of the rolling bearing 1 is disposed between the outer 3 and inner 4 rings.

The rolling bearing 1 can, for example, be made of E M50® steel.

According to another embodiment, the rolling bearing 1 can include just one row of rolling elements, such that the outer 3 and inner 4 rings each comprise a single raceway. Alternatively, the secondary rolling bearing 1 could comprise more than two rows of rolling elements.

Figure 2:
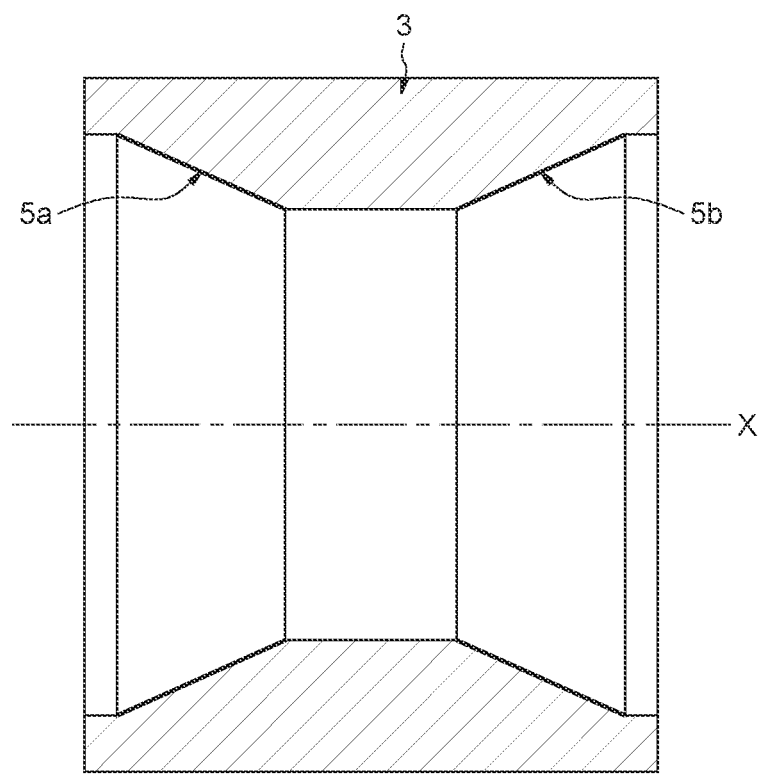
FIG. 2 is a cross-sectional view of the outer ring of the bearing of FIG. 1.

FIG. 2 shows that the outer ring 3 comprises two raceways 5a and 5b, each formed for one of the two rows of tapered rollers 2.

Figure 3:
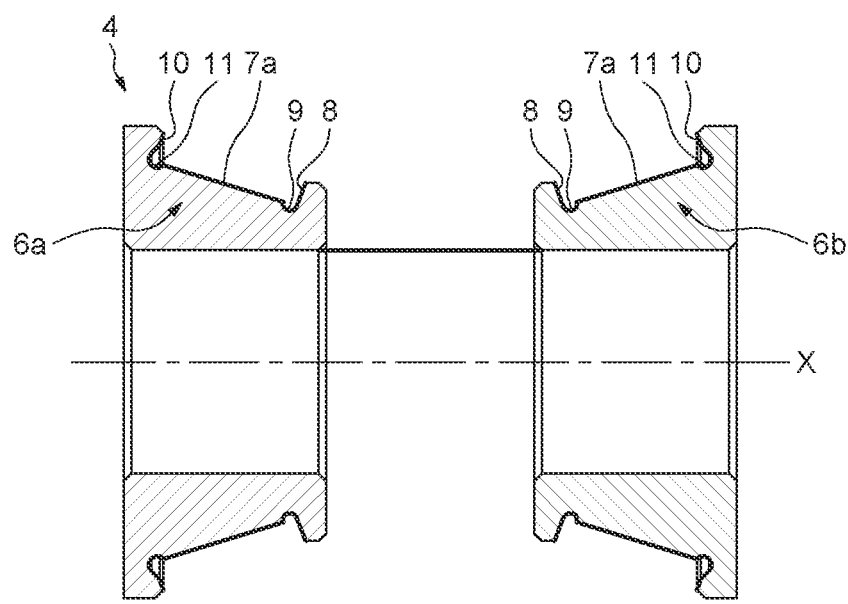
FIG. 3 is a cross-sectional view of the inner ring of the bearing of FIG. 1.

The inner ring 4 illustrated, visible in FIG. 3, is formed by two half-rings or parts 6a and 6b, each part 6a, 6b comprising a raceway, respectively 7a and 7b, for a row of tapered rollers 2.

The two parts 6a and 6b of the inner ring 4 illustrated form two distinct pieces. Obviously, there is no departure from the scope of the invention when the inner ring 4 is produced in a single piece.

The surface of each part of the inner ring 4 which is disposed facing the rolling elements 2 comprises a retaining shoulder 8, the raceway 7a, 7b, a first machining undercut 9 situated between the raceway 7a, 7b and the retaining shoulder 8, a guiding shoulder 10 situated on the side opposite the retaining shoulder 8 with respect to the raceway 7a, 7b, and a second machining undercut 11 situated between the raceway 7a, 7b and the guiding shoulder 10.

When assembled, the outer 3 and inner 4 rings of the rolling bearing 1 extend around a common axis of rotation X.

Advantageously, the raceways of the outer ring 3 at least partially comprise a coating based on chromium nitride (CrN).

Even more advantageously, the raceways of the inner ring 4 also at least partially comprise a coating based on chromium nitride. Alternatively, it remains possible to provide the coating based on chromium nitride on the raceways of just one of the outer 3 and inner 4 rings.

As can be seen in FIG. 2, in the example illustrated, the coating based on chromium nitride, shown and schematically represented by a strong line, extends only on the raceways 5a, 5b, over their entire surface.

On the other hand, as can be seen in FIG. 3, regarding the inner ring 4 of the example illustrated, the coating based on chromium nitride extends not only over all the surface of the raceways 7a and 7b, but also on the retaining shoulder 8, the first machining undercut 9, the second machining undercut 11 and the guiding shoulder 10.

When the outer 3 and inner 4 rings and the rolling elements 2 are assembled, the retaining shoulder 8 and the guiding shoulder 10 are in contact with the rolling elements such that the presence of the coating based on chromium nitride is advantageous.

The rolling elements 2 are also likely to enter into contact with the first and second machining undercuts 9 and 11 such that the presence of the coating based on chromium nitride is advantageous. Furthermore, the surface treatment of all of the raceways 7a and 7b, of the retaining shoulder 8, of the first machining undercut 9, of the second machining undercut 11 and of the guiding shoulder 10 facilitates the coating deposition step.

The coating based on chromium nitride thus extends advantageously over all the surfaces in contact with the rolling elements 2.

The coating based on chromium nitride forms a first protective barrier against contact wear.

The coating based on deposited chromium nitride can be a Balinit CNI® coating. Alternatively, it is possible to provide another type of coating based on chromium nitride.

Preferably, the thickness of the coating based on chromium nitride on the inner 4 and outer 3 rings lies between 3 and 5 nm, in order to guarantee both the effectiveness with respect to false brinelling and the adhesion of the coating.

Preferably, the hardness of the coating based on chromium nitride obtained lies between 15 and 21 GPa.

Figure 4:
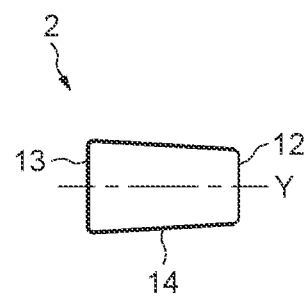
FIG. 4 is a cross-sectional view of a rolling element of the bearing of FIG. 1.

FIG. 4 illustrates one of the rolling elements 2 of the rolling bearing 1 which, in this example, are tapered rollers, rotating when the rolling bearing 1 is in operation about a proper longitudinal axis Y.

The tapered rollers comprise a first end face 12, a second end face 13 of greater diameter and opposite the first end face 12, and an outer rolling surface 14 extending between the first and second end faces 12, 13. The rolling surface 14 of each roller comes into contact against the raceways of the outer 3 and inner 4 rings. The first end face 12 of each roller comes into contact with the retaining shoulder 8, and is also likely to come into contact with the first machining undercut 9. The second end face 13 of each roller comes into contact with the guiding shoulder 10, and is also likely to come into contact with the second machining undercut 11.

The tapered rollers 2 advantageously at least partially comprise a coating based on carbon. In the example illustrated, the coating based on carbon is disposed only on one of the first and second end faces 12, 13, in this example on the second end face 13, and on the outer rolling surface 14 of the tapered rollers 2.

The coating based on carbon forms a second protective barrier against contact wear.

The coating based on carbon can be a diamond-type carbon coating mixed with a metal. In the example illustrated, the deposited coating based on carbon is a NoWear® coating, the composition of which is described in the document WO1999014512A1.

Alternatively, it is possible to provide another type of coating based on carbon, for example a Balinit C® or Balinit C Star® coating. According to another alternative, the coating based on carbon can also comprise molybdenum disulfide such as, for example, the MoST® coating.

Preferably, the thickness of the coating based on carbon lies between 1 and 3 µm, in order to guarantee both the effectiveness with respect to false brinelling and the adhesion of the coating.

Preferably, the hardness of the coating based on carbon obtained lies between 10 and 15 GPa.

The coating based on carbon and the coating based on chromium nitride can advantageously be applied by a vacuum deposition method. In the example illustrated, the deposition method used is a physical vapour-phase deposition method, better known as physical vapour deposition or PVD.

Alternatively, the coating based on carbon and the coating based on chromium nitride can be applied by a plasma-assisted chemical vapour-phase deposition method, better known as plasma-assisted chemical vapour deposition or PACVD.

In the example illustrated, the NoWear® coating is deposited by the PACVD method and the coating based on chromium nitride is deposited by the PVD method.

The coating based on carbon on the rolling elements 2 and the coating based on chromium nitride on the outer 3 and inner 4 rings form two barriers against contact wear of the friction surfaces. Their presence reduces in particular the appearance of false brinelling on the surface of the raceways 5a, 5b, 7a and 7b.

According to one embodiment, the coating based on chromium nitride can be deposited on all of the surface of the outer ring 3 and/or of the inner ring 4 comprising the raceways 5a, 5b, 7a and 7b.

Figure 5:
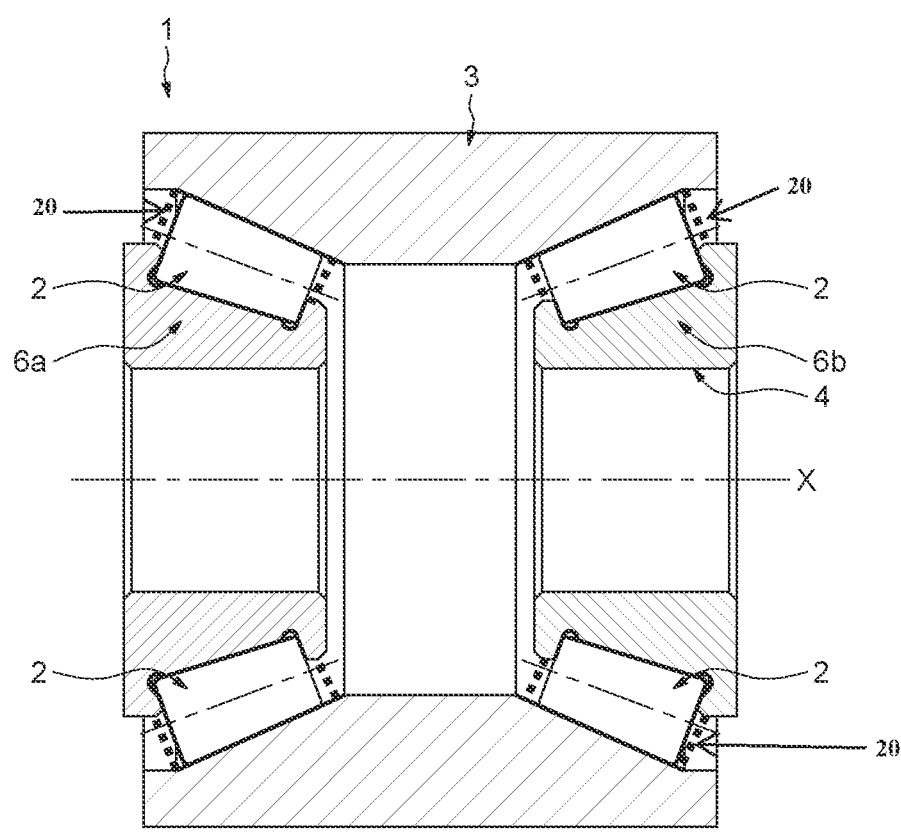
FIG. 5 illustrates a rolling bearing with seals 20 shown schematically.

According to one embodiment, the rolling bearing 1 further comprises two seals 20 (shown schematically in FIG. 5) disposed between the rings and delimiting a leaktight space inside which are housed the rows of rolling elements 2. This leaktight space advantageously contains grease comprising molybdenum disulfide.

The grease can be applied at least on the raceways 5a, 5b, 7a, 7b of the outer 3 and inner 4 rings and on the rolling elements 2 of the rolling bearing 1. Preferably, all the surface of the inner 4 and outer 3 rings disposed facing one another when they are assembled are advantageously lubricated with the grease comprising molybdenum disulfide.

The molybdenum disulfide $MoS_2$ makes it possible to reduce the friction, notably on the steel, and makes it possible to further reduce the wear of the outer and inner rings 3, 4 of the rolling bearing 1, in particular of the raceways 5a, 5b, 7a and 7b.

Obviously, the surface treatment comprising the application of a coating based on carbon nitride on the raceways 5a, 5b, 7a and 7b and of a coating based on carbon on the rolling elements 5 will be able to be carried out on any type of rolling bearing, other than a tapered roller rolling bearing. For example, it will be able to be carried out on any type of ball bearing, roller bearing or even needle bearing.

Furthermore, the surface treatment will be able to be carried out on a rolling bearing associated with any type of application, other than a rear helicopter rotor.

In the exemplary embodiment illustrated, the rolling bearing comprises two rows of rolling elements produced in the form of rollers. There is no departure from the scope of the invention when the rolling bearing comprises a single row or more than two rows of rolling elements, and/or other types of rolling elements, for example balls.

The invention claimed is:

1. A rolling bearing comprising:
an outer ring,
an inner ring, and
at least one row of rolling elements disposed between two raceways of the outer and inner rings, wherein
the raceway of the outer ring and the raceway of the inner ring at least partially comprise a coating based on chromium nitride, the rolling elements at least partially comprising a second coating comprising carbon,
the inner ring comprises a retaining shoulder, a first machining undercut, a second machining undercut, and guide shoulder,
and the coating based on chromium nitride is disposed on a portion of the retaining shoulder, a portion of the guiding shoulder, all of the first machining undercut, all of the second machining undercut and all of the raceway.

2. The rolling bearing according to claim 1, further comprising at least two seals disposed between the outer and inner rings and delimiting between the rings a leaktight space inside which is housed the row of rolling elements, the leaktight space being filled with grease comprising molybdenum disulfide.

3. The rolling bearing according to claim 1, wherein the raceway of the outer ring is fully coated by the coating based on chromium nitride.

4. The rolling bearing according to claim 1, wherein the rolling elements are rollers comprising a first end face, a second end face opposite the first end face, and an outer rolling surface extending between the first and second end faces, the second coating comprising carbon being disposed only on one of the end faces and on the outer rolling surface of each roller.

5. The rolling bearing according to claim 1, wherein the rolling elements are rollers comprising a first end face, a second end face opposite the first end face, and an outer rolling surface extending between the first and second end faces, where the chromium nitride is disposed on all of the raceway and all of the surface of the inner ring facing the end faces of the rollers.

6. The rolling bearing according to claim 1, wherein the thickness of the second coating comprising carbon lies between 1 and 3 µm.

7. The rolling bearing according to claim 1, wherein the thickness of the coating based on chromium nitride lies between 3 and 5 µm.

8. The rolling bearing according to claim 1, wherein the raceways are formed directly on the outer and inner rings.

9. The rolling bearing according to claim 1, wherein the second coating comprising carbon is a diamond-type carbon coating mixed with a metal.

10. A rolling bearing comprising:
an outer ring;
an inner ring; and
at least one row of rolling elements disposed between two raceways of the outer and inner rings; wherein
the raceway of the outer ring and the raceway of the inner ring at least partially comprise a coating based on chromium nitride, the rolling elements at least partially comprising a second coating comprising carbon;
the inner ring comprises a retaining shoulder, a first machining undercut, a second machining undercut, a guiding shoulder;
and the coating based on chromium nitride is disposed on a portion of the retaining shoulder, a portion of the guiding shoulder, all of the first machining undercut, all of the second machining undercut and all of the raceway;
the raceway of the outer ring is formed by a linear surface which extends beyond the axial ends of the rolling elements;
and wherein the coating is disposed over the linear surface from a first linear surface end to a second linear surface end.

11. The rolling bearing according to claim 10, further comprising at least two seals disposed between the outer and inner rings and delimiting between the rings a leaktight space inside which is housed the row of rolling elements, the leaktight space being filled with grease comprising molybdenum disulfide.

12. The rolling bearing according to claim 10, wherein the raceway of the outer ring is fully coated by the coating based on chromium nitride.

13. The rolling bearing according to claim 10, wherein the rolling elements are rollers comprising a first end face, a second end face opposite the first end face, and an outer rolling surface extending between the first and second end faces, where the chromium nitride is disposed on all of the raceway and all of the surface of the inner ring facing the end faces of the rollers.

14. The rolling bearing according to claim 10, wherein the thickness of the second coating comprising carbon lies between 1 and 3 µm.

15. The rolling bearing according to claim 10, wherein the thickness of the coating based on chromium nitride lies between 3 and 5 µm.

16. The rolling bearing according to claim 10, wherein the second coating comprising carbon is a diamond-type carbon coating mixed with a metal.

17. A rolling bearing comprising:
an outer ring;
an inner ring; and
at least one row of rolling elements disposed between two raceways of the outer and inner rings; wherein
the raceway of the outer ring and the raceway of the inner ring at least partially comprise a coating based on chromium nitride, the rolling elements at least partially comprising a second coating comprising carbon;
the inner ring comprises a retaining shoulder, a first machining undercut, a second machining undercut, and guide shoulder;
and the coating based on chromium nitride is disposed on a portion of the retaining shoulder, a portion of the guiding shoulder, all of the first machining undercut, all of the second machining undercut and all of the raceway;
wherein the hardness of the second coating is 10-15 GPa.

18. The roller bearing of claim 17, wherein the second coating comprise molybdenum disulfide.

* * * * *